(12) United States Patent
Schnack

(10) Patent No.: US 8,090,608 B2
(45) Date of Patent: Jan. 3, 2012

(54) IDENTIFYING TECHNOLOGICAL SOLUTIONS FOR USER-CENTRIC PRODUCT DESIGNS

(75) Inventor: Lisa J. Schnack, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1415 days.

(21) Appl. No.: 11/612,215

(22) Filed: Dec. 18, 2006

(65) Prior Publication Data

US 2008/0147451 A1 Jun. 19, 2008

(51) Int. Cl.
*G06F 17/00* (2006.01)
(52) U.S. Cl. ..................................... 705/7.11
(58) Field of Classification Search ...... 705/7; 905/7.11
See application file for complete search history.

(56) References Cited

U.S. PATENT DOCUMENTS

| 5,999,908 | A | * | 12/1999 | Abelow | 705/7 |
| 6,058,262 | A | * | 5/2000 | Kawas et al. | 703/13 |
| 6,145,096 | A | * | 11/2000 | Bereiter et al. | 714/25 |
| 2002/0038234 | A1 | | 3/2002 | Fu | |
| 2003/0191793 | A1 | | 10/2003 | Dolin | |
| 2005/0015710 | A1 | | 1/2005 | Williams | |
| 2005/0033615 | A1 | | 2/2005 | Nguyen | |
| 2005/0165631 | A1 | | 7/2005 | Horvitz | |
| 2005/0192870 | A1 | * | 9/2005 | Geddes | 705/26 |
| 2005/0203783 | A1 | | 9/2005 | Allen | |
| 2005/0216324 | A1 | | 9/2005 | Maithell | |
| 2006/0041460 | A1 | | 2/2006 | Aaron | |
| 2006/0200374 | A1 | | 9/2006 | Nelken | |

FOREIGN PATENT DOCUMENTS

WO WO2004107228 A2 12/2004
WO WO2006085314 A2 8/2006

OTHER PUBLICATIONS

Chien et al., "Using Iterative Repair to Improve the Responsiveness of Planning and Scheduling," American Assn. for Artificial Intelligence, 2000, 8 pp., Jet Propulsion Laboratory, Calif. Inst. of Tech., Pasadena, CA.
Fukumaga et al., "Towards an Application Framework for Automated Planning and Scheduling," Proceedings of IEEE Aerospace Conference, 1997, 11 pp., Snowmass, CO.

* cited by examiner

*Primary Examiner* — Thomas Dixon
(74) *Attorney, Agent, or Firm* — Shook, Hardy & Bacon L.L.P.

(57) ABSTRACT

A method to identify technological solutions for user-centric product designs is disclosed. The method includes acquiring knowledge of a user-centric product goal and a user outcome, identifying actions that may achieve the desired user outcome, and identifying tasks pertaining to each action. Upon identifying actions that may be necessary to achieve the desired outcome and identifying tasks corresponding to each action, technology may then be considered and technological solutions for performing the tasks may be determined. A visual depiction of the technological solutions charted to the corresponding tasks may be provided to assist with designing a product best suited for product users. The identified technological solutions may be implemented into the product design to produce a user-centric product.

19 Claims, 6 Drawing Sheets

IDENTIFYING TECHNOLOGICAL SOLUTIONS FOR USER-CENTRIC PRODUCT DESIGNS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Generally, products having a user-centric product design are more desirable to product users. Accordingly, in developing product designs, product developers generally desire to design products that benefit product users. In particular, product developers strive to design user-centric products, i.e., products centered about the needs and desires of product users. However, although product developers desire to achieve user-centric product designs, there is a tendency for product developers to concentrate on the product technology, rather than the product user benefits.

As a result of the focus on product technology, developers begin designing products based upon technology and not based upon product users' desires and needs as those desires and needs relate to the product design. For example, in some cases, a product developer may design a product based upon existing technology. In other cases, a product developer may design a product based upon easily attainable technology or cost-effective technology. In any case, while designing products based upon technology may initially be efficient and cost-effective, the product design may not adequately provide a user-centric product. In some cases, the product design may be refined in an attempt to achieve a user-centric product, but the refinement process is extremely inefficient and costly, offsetting any earlier benefits. In some cases, refinement isn't possible and may actually require rebuilding the product from the initial stages.

Alternatively, if the resultant product design is not refined, it may not be sufficiently tailored for product users' needs and desires. Due to product dissatisfaction, product users may discontinue using the particular product in some cases. In other cases, product users may provide poor product reviews or may fail to recommend the product. In yet other cases, product users may refuse to purchase or even use the product.

In such cases, product developers may wish to identify technological solutions for use in product designs without neglecting product users' needs and desires. However, there is currently no simple and convenient way for product developers to identify technological solutions for user-centric product designs.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

A method for identifying technological solutions for use in user-centric product designs is described herein. Knowledge of a user-centric product goal and user outcomes may be acquired. Upon acquiring knowledge of the user outcome, actions that may realize the desired user outcome(s) are identified, and tasks pertaining to each action are also identified. Upon identifying actions that may be necessary to achieve the desired outcome and identifying tasks corresponding to each action, technology is considered and technological solutions for performing the tasks are determined. A visual depiction of the technological solutions charted to the corresponding tasks may be provided to assist in designing a product best suited for product users. The identified technological solutions may be implemented into the product design to produce a user-centric product.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
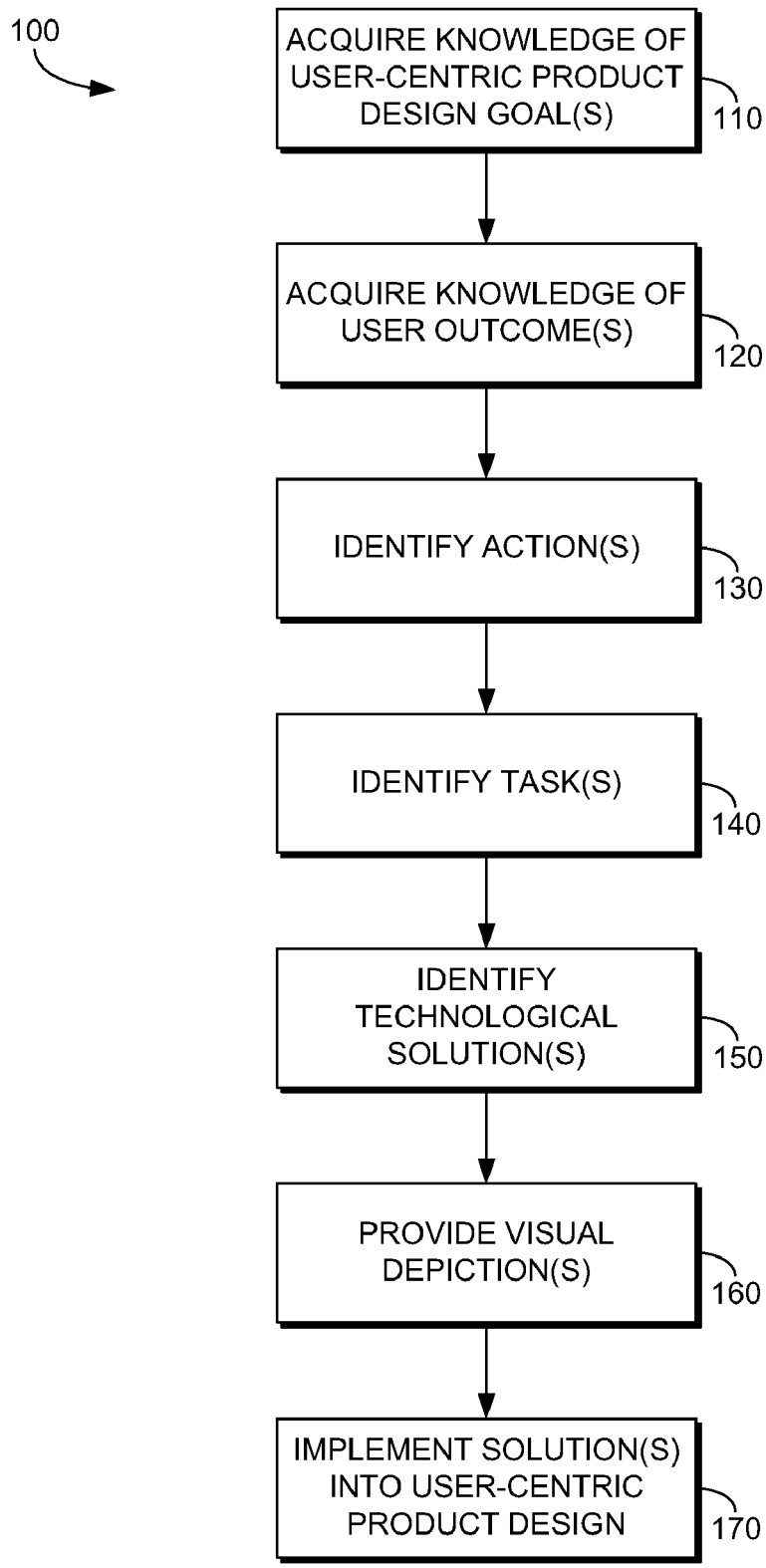
FIG. 1 is a flow diagram showing an exemplary method for identifying technological solutions for use in a product design in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention accomplishes a user-centric product design even though technological solutions are not identified at the beginning of the product development process. Prior to contemplating technological solutions for a product design, a plurality of tasks are performed to assist in achieving a desired outcome. For example, after determining a desired user outcome, actions that may achieve the predetermined outcome and tasks that may accomplish the related actions are identified. When the outcome, actions, and related tasks are known, actual and potential technology focused solutions that may achieve a user-centric product design may be contemplated.

The present invention may be particularly applicable in achieving user-centric computer software designs. For instance, a software developer having knowledge of a desired user outcome may determine possible tasks to achieve the user outcome as well as tasks to accomplish the related actions. After the outcome, actions, and related tasks are known, the software developer can then determine software solutions that will achieve a user-centric software design.

Embodiments of the present invention permit, among other things, a product developing entity to identify technological solutions for use in a user-centric product design. A product developing entity may be an individual, group of individuals, or organization that have a role in designing a product. A product developing entity may acquire knowledge of a user-centric product goal and a user outcome. Upon acquiring knowledge of the user outcome, a product developing entity identifies actions that may be necessary to realize the desired user outcome as well as tasks pertaining to each action. After identifying actions and corresponding tasks, a product developing entity may then consider technology and determine technological solutions for performing the tasks. A visual depiction of the technological solutions may be provided to assist with the product design. The identified technological solutions may be implemented into the product design to produce a user-centric product. As such, embodiments of the present invention provide a simple and convenient way for product developers to effectively identify technological solutions for use in a user-centric product design.

Accordingly, one embodiment of the present invention is directed to a method for identifying technological solutions for use in a user-centric product design. The method includes acquiring knowledge of a user outcome based on a user-centric product design goal. The method also includes identifying actions to realize at least a portion of the user outcome and identifying tasks for the identified actions. The method further includes identifying technological solutions for the tasks.

Another embodiment of the present invention is related to a method for identifying computer software solutions for use in a user-centric product design. The method includes, prior to considering technology, acquiring knowledge of a user-centric product design goal, determining user outcomes based on the user-centric product design goal, identifying actions to realize at least a portion of the user outcomes, and identifying tasks for the identified actions. The method further includes identifying computer software solutions for the identified tasks.

A further embodiment of the present invention is directed to a method for developing a computer software product. The method includes, prior to considering technology, acquiring knowledge of a user-centric product design goal, acquiring knowledge of user outcomes based on the user-centric product design goal, identifying actions to realize at least a portion of the user outcomes, and identifying tasks for the identified actions. The method also includes identifying computer software solutions for the identified tasks. The method further includes providing a visual depiction of the computer software solutions charted to the tasks, wherein the visual depiction of the computer software solutions charted to the tasks is a flow diagram. The method further includes developing the computer software product by implementing the computer software solutions into the product design for the computer software product.

Referring initially to FIG. 1, a method for identifying technological solutions for use in a product design in accordance with the present invention is illustrated and designated generally as method 100. Method 100 is but one example of a suitable method and is not intended to suggest any limitation as to the scope of the invention.

At block 110, a product developing entity acquires knowledge of a user-centric product design goal. A user-centric product design goal may be a goal dedicated to achieving a product design that realizes product users' needs and desires. The user-centric product design goal may pertain to a new product, a new product feature, an existing product, or an existing product feature.

In one embodiment, knowledge of a user-centric product design goal may be acquired from another source, such as a product planning entity. A product planning entity may be an individual, group of individuals, or organization that have a role in planning for a product. A product planning entity may be internal and/or external to a product developing entity. For example, a product planning entity may determine user needs and desires based upon, among other things, market research and analysis, brainstorming, or market testing. The product planning entity may then determine a user-centric product design goal based upon the predetermined users' needs and desires. After the product planning entity determines a user-centric product design goal, the product planning entity may communicate the user-centric product design goal to the product developing entity.

In another embodiment, a product developing entity may determine the user-centric product design goal itself and thereby acquire knowledge of the goal. For example, in one case, a product planning entity may determine user needs and desires based upon, among other things, market research and analysis, brainstorming, or market testing. After the product planning entity determines a product users' needs and desires, the product planning entity may communicate the users' needs and desires to the product developing entity. Thereafter, the product developing entity may determine a user-centric product design goal based upon the users' needs and desires communicated by the product planning entity and thereby acquire knowledge of a user-centric product design goal. In another case, a product developing entity may perform market research and analysis, brainstorming, or market testing to determine a user-centric product design goal and thereby acquire knowledge of the goal.

At block 120, a product developing entity acquires knowledge of at least one user outcome. The user outcome may be based upon a predetermined user-centric product design goal established at block 120. One user outcome or multiple user outcomes may be determined for each user-centric product design goal.

In one embodiment, knowledge of at least one user outcome may be acquired from another source, such as a product planning entity. For example, a product planning entity may determine a user-centric product design goal and thereupon determine at least one user outcome. After the product planning entity determines at least one user outcome, the product planning entity may communicate the at least one user outcome to the product developing entity.

In another embodiment, a product developing entity may determine at least one user outcome itself and thereby acquire knowledge of at least one user outcome. For example, in one case, a product planning entity may determine a user-centric product design goal and communicate the goal to the product developing entity. Upon acquiring knowledge of the user-centric product design goal, the product developing entity may then determine at least one user outcome and thereby acquire knowledge of at least one user outcome. In another case, a product developing entity may itself determine at least one user outcome and thereby acquire knowledge of at least one user outcome. The at least one user outcome determined by a product developing entity may be based upon its own determination of a user-centric product design goal or based upon its own market research and analysis, brainstorming, or market testing.

At block 130, a product developing entity identifies at least one action that pertains to each user outcome. The identified actions may be actions an entity may be required to perform so that the predetermined user outcome may be attained. In one embodiment, only one action may be identified that will accomplish either a portion or all of a predetermined user outcome. In another embodiment, multiple actions may be identified that will accomplish either a portion or all of a predetermined user outcome.

At block 140, a product developing entity identifies at least one task for each identified action. The identified tasks may be actions an entity may be required to perform so that the actions identified at block 130 may be accomplished. In one embodiment, only one task may be identified for a particular action. In another embodiment, multiple tasks may be identified for a particular action. Further, in yet another embodiment, subtasks for each identified task may also be identified at block 140.

At block 150, a product developing entity identifies at least one technological solution for each identified task. The technological solutions identified in block 150 may be technological solutions that a product user may use to accomplish each task. In one embodiment, a product development entity may look to existing technology in identifying technological solutions to accomplish a specific task. In another embodiment, a product development entity may design a new technological solution to accomplish a specific task.

In one embodiment, only one technological solution may be identified for a particular task. In another embodiment, multiple technological solutions may be identified for a particular task. Each identified technological solution may achieve either a portion or all of the task.

At block 160, at least one visual depiction may be provided. The visual depiction may chart the technological solution to an identified task. In one embodiment, a flow diagram may be used to demonstrate the work flow for each task, i.e., the relationship of tasks and subtasks and the corresponding technological solutions. A flow diagram may allow a product developing entity to view a visual depiction of the work flow for each task and, accordingly, design a product best suited for the user. While developing the visual depiction, new subtasks may be identified.

In one embodiment, only one visual depiction may be provided to demonstrate the work flow for a task or multiple tasks. In another embodiment, multiple visual depictions may be provided to demonstrate the work flow for a task or multiple tasks. In yet another embodiment, the step of providing a visual depiction may be eliminated.

At block 170, the technological solutions identified at block 160 may be implemented into a user-centric product design. In one embodiment, one technological solution may be implemented into a user-centric product design. In another embodiment, multiple technological solutions may be implemented into a user-centric product design. In yet another embodiment, the step of implementing technological solutions into a user-centric product design may be eliminated.

Figure 2:
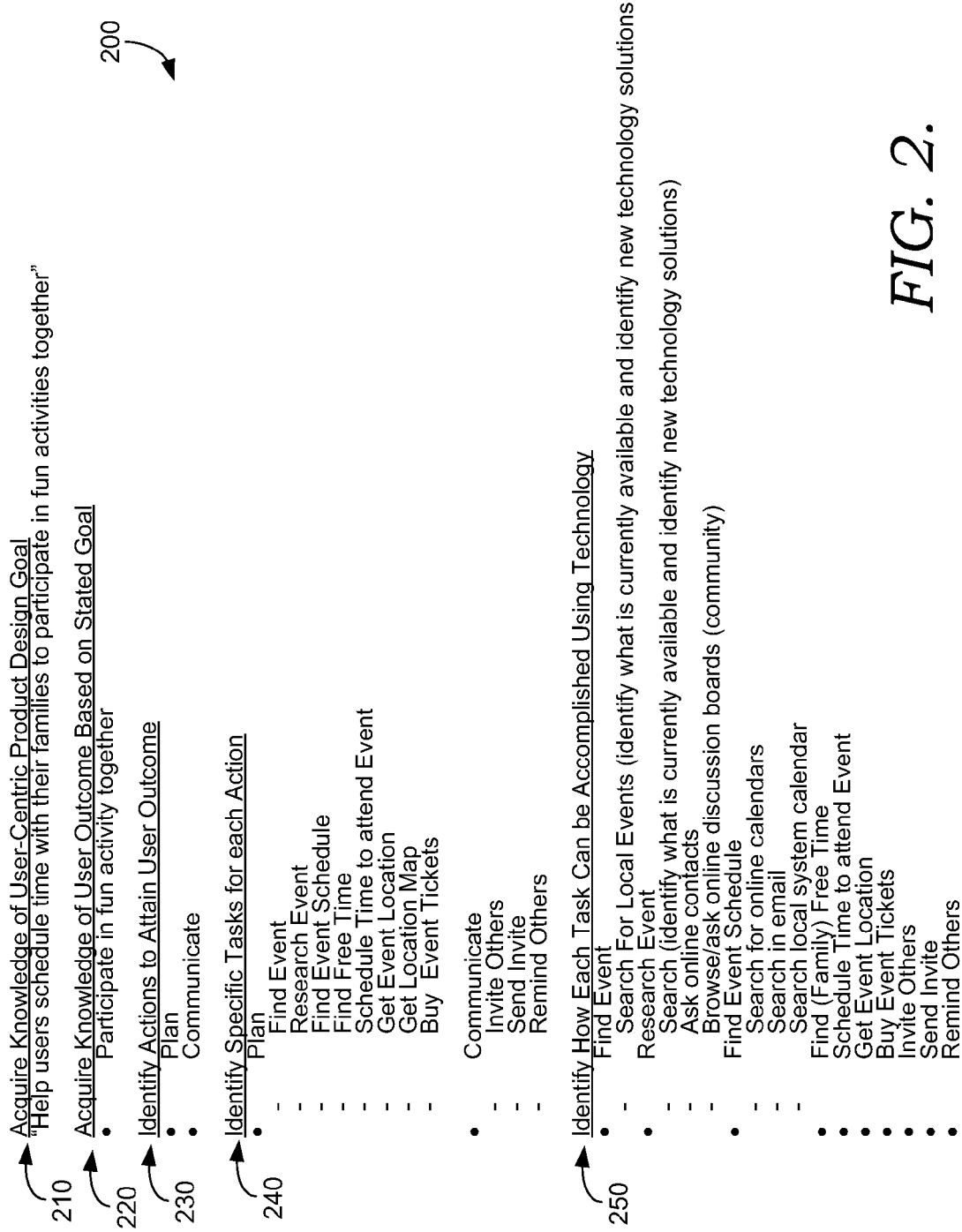
FIG. 2 illustrates an example of a method for identifying technological solutions for use in a product design in accordance with an embodiment of the present invention.
Figure 3A:
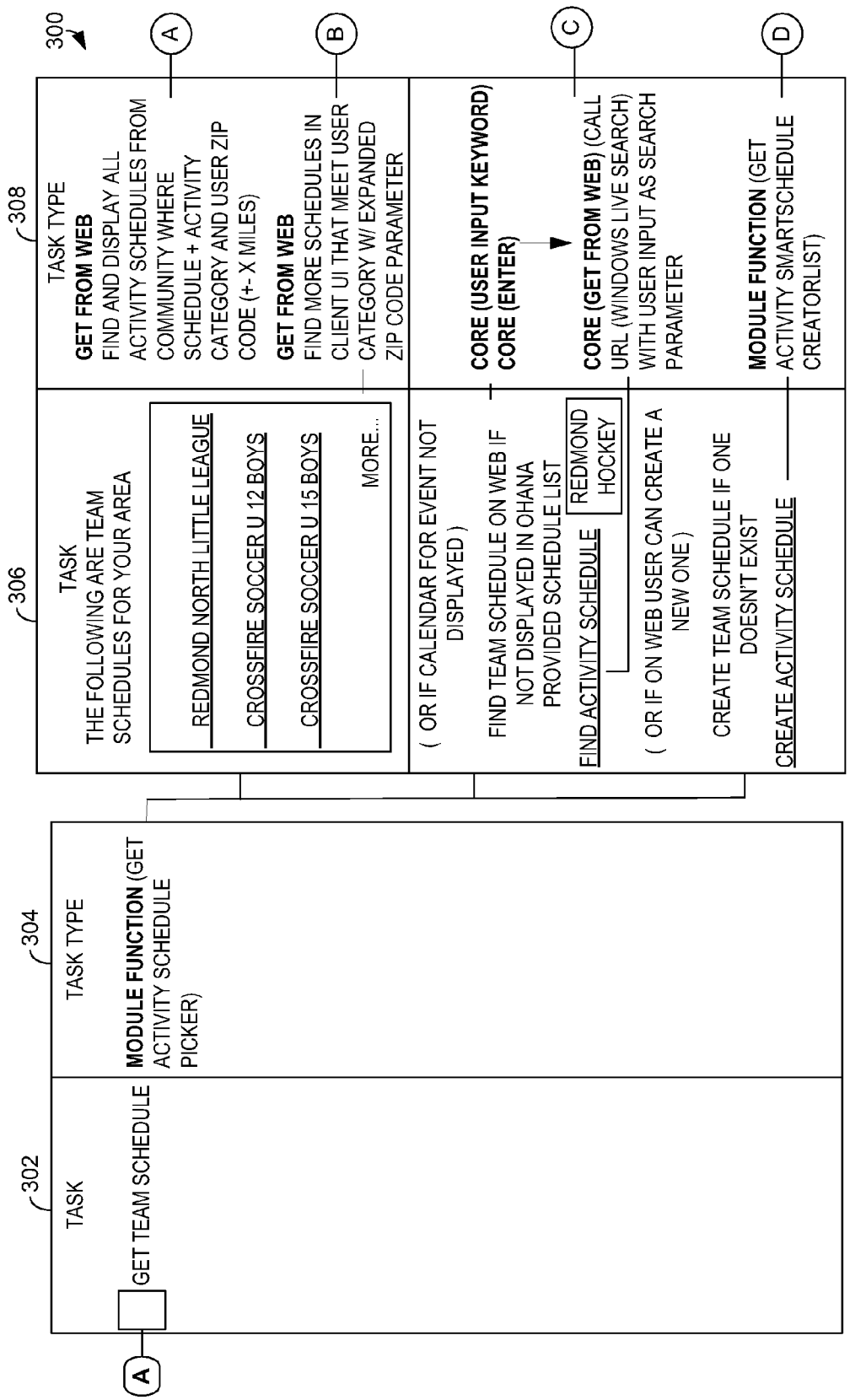
FIGS. 3A-3D illustrates an example of a visual depiction in accordance with an embodiment of the present invention.
Figure 3B:
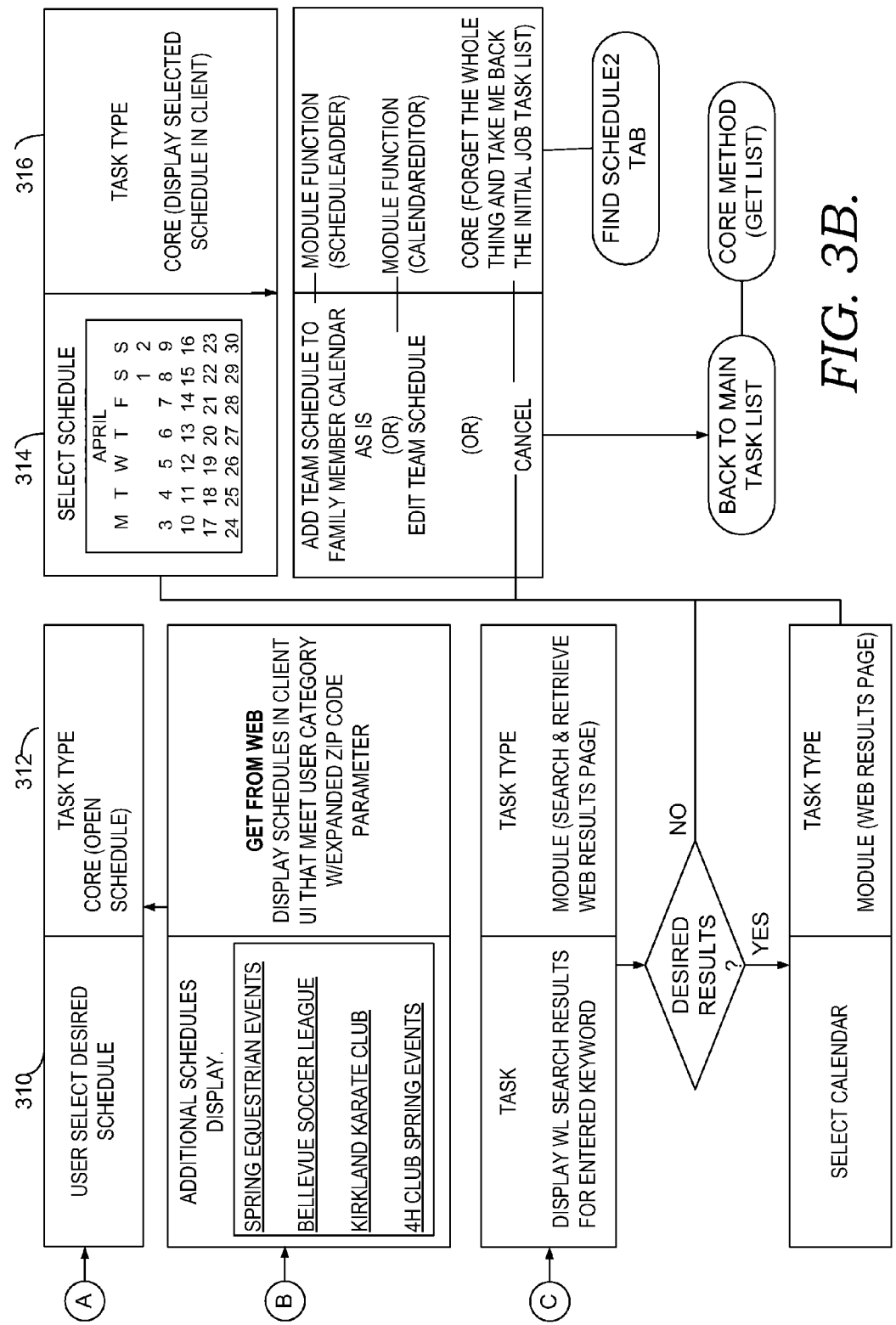
Figure 3C:
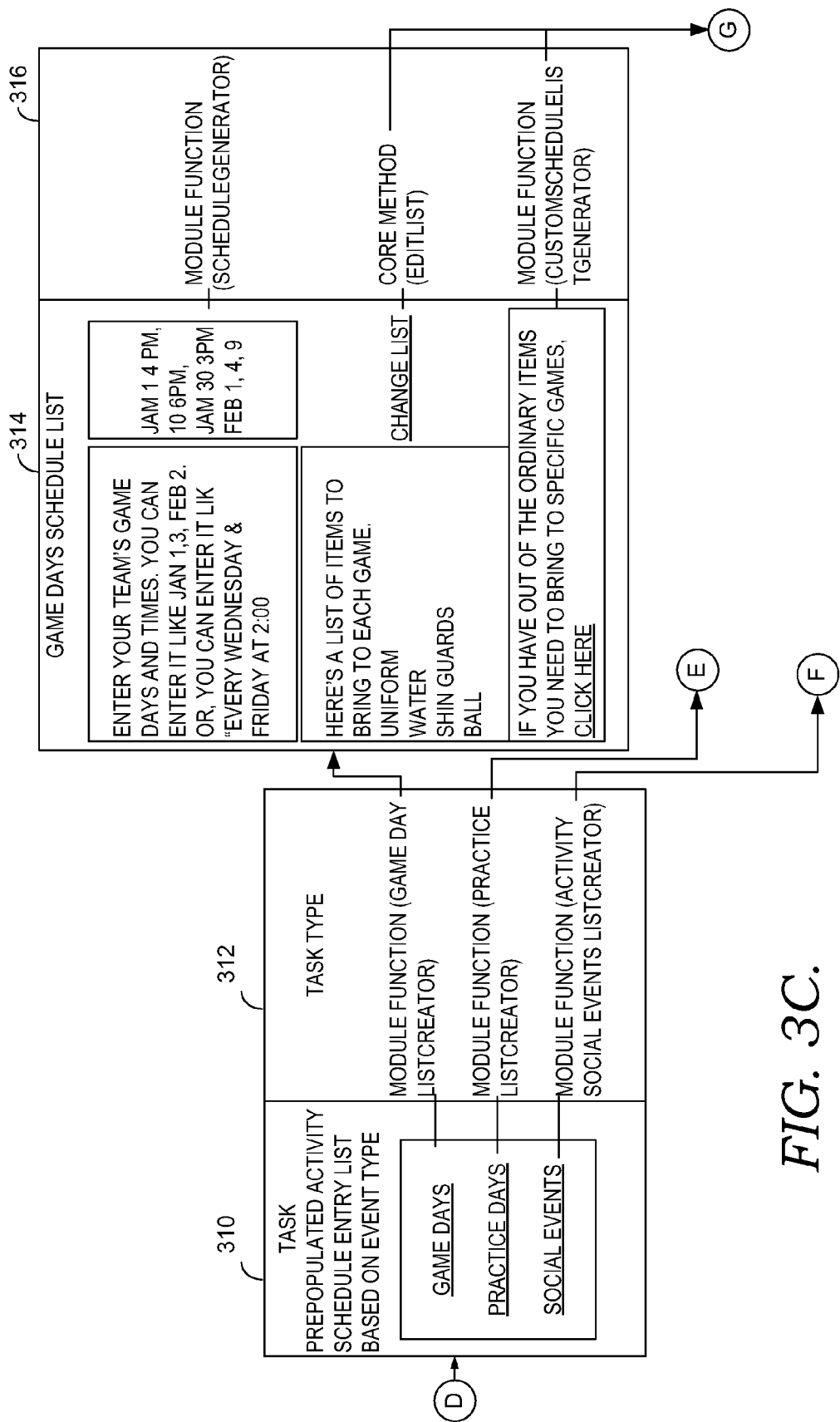
Figure 3D:
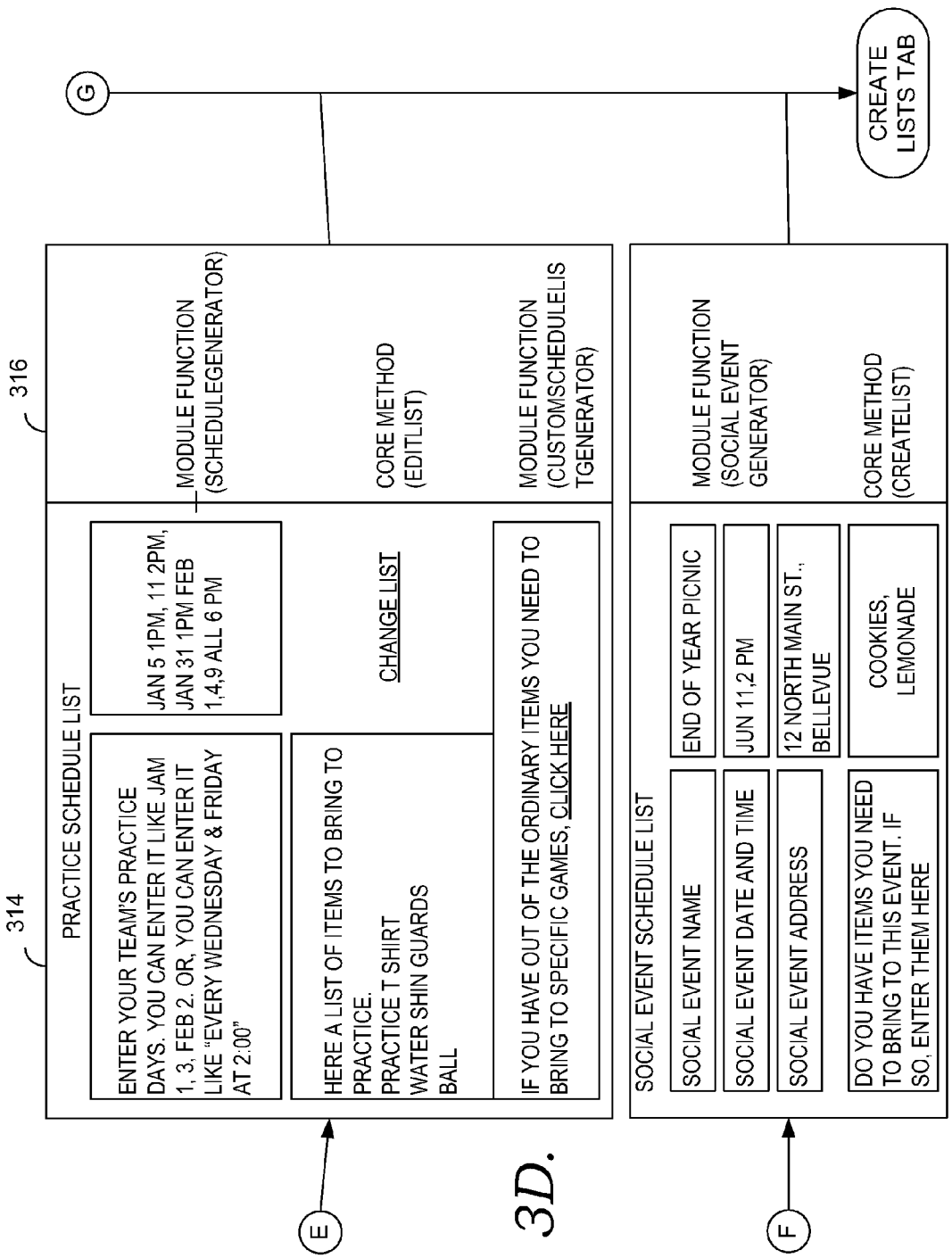

Referring now to FIG. 2, an example of a method for identifying a technology solution for use in a product design in accordance with the present invention is illustrated and designated generally as method example 200. Method example 200 is but one example of a suitable method and is not intended to suggest any limitation as to the scope of the invention.

At step 210, knowledge of a user-centric product design goal is acquired. In method example 200, the user-centric product design goal is to "[h]elp users schedule time with their families to participate in fun activities together." Knowledge of a user outcome based on the user-centric product design goal may be acquired at step 220. In method example 200, the user outcome is to "[p]articipate in fun activity together."

At step 230, at least one action to realize at least a portion of the user outcome is identified. In method example 200, examples of actions that may attain the predetermined user outcome, "[p]articipate in fun activity together," include a "plan" action and a "communicate" action. For example, in order for a family to participate in a fun activity together, an individual would need to plan the activity and communicate the activity to others.

Identifying at least one task used to accomplish at least a portion of the action occurs at step 240. In method example 200, the tasks that may be performed to realize the "plan" action may include "finding an event," "researching an event," "finding event schedule," "finding free time," "scheduling time to attend event," "getting event location," "getting location map," and "buying event tickets." Further, the tasks that may be performed to realize the "communicate" action may include "inviting others," "sending invitations," and "reminding others."

At step 250, technology solutions for accomplishing at least a portion of the tasks identified at step 240 are identified. In method example 200, the "find event" task may be accomplished with technology, for example, by searching for local events. In this method example 200, existing technology and new technology for searching for local events may be considered. The "research event" task may be accomplished with technology, for example, by searching for the event, asking online contacts, or browsing/asking online discussion boards within the community. In this method example 200, existing technology and new technology for searching for the event may be considered. The "find event schedule" task may be accomplished with technology, for example, by searching for online calendars, searching emails, and searching a local system calendar.

Referring now to FIGS. 3A-3D, an example of a visual depiction in accordance with an embodiment of the present invention is illustrated and designated generally as visual depiction 300. Visual depiction 300 is but one example of a suitable method and is not intended to suggest any limitation as to the scope of the invention. Visual depiction 300 provides a flow diagram charting technological solutions to a task of finding a team schedule.

Visual depiction 300 demonstrates the relationship of the task and subtasks and the corresponding technological solutions. In visual depiction 300, an identified task 302 is to "Get Team Schedule." In visual depiction 300, technological solutions are positioned adjacent to corresponding tasks and subtasks. Thus, a technology solution 304 for the "Get Team Schedule" task is positioned adjacent to task 302. Task 302 has a plurality of first subtasks 306. In visual depiction 300, the plurality of first subtasks 306 are displaying area team schedules, finding team schedule if team schedule is not displayed, and creating team schedule if team schedule is not displayed or located. The corresponding technological solutions 308 are positioned adjacent to the plurality of first subtasks 306. Each first subtask 306 has a second subtask 310. The corresponding technological solutions 312 are positioned adjacent to the plurality of second subtasks 310. Finally, each second subtask 310 has a third subtask 314. The corresponding technological solutions 316 are positioned adjacent to the plurality of third subtasks 314.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A method for identifying at least one technological solution for use in a user-centric product design, comprising:
   prior to designing a user-centric product:
   acquiring knowledge of at least one user outcome based on a user-centric product design goal;
   identifying at least one action to attain at least a portion of the at least one user outcome;
   identifying at least one task used to accomplish the at least one action;
   identifying at least one technological solution for the at least one task, the technological solution being used to accomplish the at least one task;
   providing a visual depiction to chart the technological solution to the identified task
   developing the user-centric product by implementing the at least one technological solution into the product design for the user-centric product; and
   using a computing device to accomplish the at least one task.

2. The method of claim 1, wherein the user-centric product design is a design for a new product or product feature.

3. The method of claim 1, wherein the user-centric product design is a design for an existing product or product feature.

4. The method of claim 1, wherein the knowledge of the at least one user outcome is acquired by determining the at least one user outcome.

5. The method of claim 1 further comprising acquiring knowledge of at least one user-centric product design goal.

6. The method of claim 5, wherein the knowledge of the at least one user-centric product design goal is acquired by determining the at least one user-centric product design goal.

7. The method of claim 1 further comprising providing a visual depiction of the at least one technological solution charted to the at least one task.

8. The method of claim 1, wherein the visual depiction of the at least one technological solution charted to the at least one task is a flow diagram.

9. The method of claim 1 further comprising implementing the at least one technological solution into the user-centric product design.

10. A method for identifying computer software solutions for use in user-centric product designs, comprising:
    prior to considering technology to initially develop a user-centric product:
    acquiring knowledge of at least one user-centric product design goal,
    acquiring knowledge of at least one user outcome based on the at least one user-centric product design goal, the at least one user outcome being an outcome to occur when the at least one user-centric product design goal is achieved,
    identifying at least one action to attain at least a portion of the at least one user outcome, and
    identifying at least one task used to accomplish the at least one action;
    identifying the at least one computer software solution for the at least one task;
    using a computing device to accomplish the at least one task, and
    providing a visual depiction to chart the at least one computer software solution to the identified task.

11. The method of claim 10, wherein the user-centric product design is a design for a new product or product feature.

12. The method of claim 10, wherein the user-centric product design is a design for an existing product or product feature.

13. The method of claim 10, wherein the knowledge of at least one user-centric product design goal is acquired by determining the at least user-centric product design goal.

14. The method of claim 10, wherein the knowledge of at least one user outcome is acquired by determining the at least one user outcome.

15. The method of claim 10 further comprising providing a visual depiction of the at least one computer software solution charted to the at least one task.

16. The method of claim 15, wherein the visual depiction of the at least one computer software solution charted to the at least one task is a flow diagram.

17. The method of claim 10 further comprising implementing the at least one computer software solution into the user-centric product design.

18. A method for developing a computer software product, comprising:
    prior to considering technology and developing a new computer software product:
    acquiring knowledge of at least one user-centric product design goal,
    acquiring knowledge of at least one user outcome based on the at least one user-centric product design goal, the at least one user outcome being an outcome to occur when the at least one user-centric product design goal is achieved,
    identifying at least one action to attain at least a portion of the at least one user outcome,
    identifying at least one task used to accomplish the at least one action,
    identifying at least one computer software solution used to accomplish the at least one task, and
    providing a visual depiction of the at least one computer software solution charted to the at least one task, wherein the visual depiction of the at least one computer software solution charted to the at least one task is a flow diagram;
    developing the new computer software product by implementing the at least one computer software solution into the product design for the new computer software product; and
    using a computing device to accomplish the at least one task.

19. The method of claim 18, wherein the new computer software product is a new product or a new product feature.

* * * * *

UNITED STATES PATENT AND TRADEMARK OFFICE
CERTIFICATE OF CORRECTION

PATENT NO.        : 8,090,608 B2                    Page 1 of 1
APPLICATION NO.   : 11/612215
DATED             : January 3, 2012
INVENTOR(S)       : Lisa J. Schnack It is certified that error appears in the above-identified patent and that said Letters Patent is hereby corrected as shown below:

In column 7, line 39, in Claim 8, delete "claim 1," and insert -- claim 7, --, therefor.

Signed and Sealed this
Twenty-sixth Day of June, 2012

David J. Kappos
*Director of the United States Patent and Trademark Office*